US008120610B1

(12) United States Patent
Stratton (10) Patent No.: US 8,120,610 B1
(45) Date of Patent: Feb. 21, 2012

(54) METHODS AND APPARATUS FOR USING ALIASES TO DISPLAY LOGIC

(75) Inventor: Norman A. Stratton, Littleton, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1094 days.

(21) Appl. No.: 11/375,742

(22) Filed: Mar. 15, 2006

(51) Int. Cl.
*G06T 11/20* (2006.01)

(52) U.S. Cl. .................. 345/440; 345/440.1; 345/440.2; 717/143; 717/154; 717/155; 717/156; 717/157

(58) Field of Classification Search .................. 345/440, 345/440.1, 440.2; 717/143, 154, 155, 156, 717/157
See application file for complete search history.

(56) References Cited

U.S. PATENT DOCUMENTS

| | | | | |
|---|---|---|---|---|
| 5,297,150 A * | 3/1994 | Clark | ............................. | 714/26 |
| 5,515,487 A * | 5/1996 | Beaudet et al. | ............... | 345/440 |
| 5,821,945 A * | 10/1998 | Yeo et al. | ...................... | 345/440 |
| 5,892,507 A * | 4/1999 | Moorby et al. | ................ | 715/205 |
| 6,381,739 B1 * | 4/2002 | Breternitz et al. | .............. | 714/37 |
| 6,633,886 B1 * | 10/2003 | Chong | ......................... | 707/102 |
| 6,848,100 B1 * | 1/2005 | Wu et al. | ....................... | 717/157 |
| 6,907,599 B1 * | 6/2005 | Kashai et al. | .................. | 717/137 |
| 7,102,641 B2 * | 9/2006 | Hudson, Jr. | ................... | 345/440 |
| 7,225,405 B1 * | 5/2007 | Barrus et al. | .................. | 715/716 |
| 2002/0016861 A1 * | 2/2002 | Simonoff | ...................... | 709/250 |
| 2002/0085002 A1 * | 7/2002 | Lamping et al. | .............. | 345/441 |
| 2002/0107681 A1 * | 8/2002 | Goodkovsky | ................... | 703/22 |
| 2004/0093588 A1 * | 5/2004 | Gschwind et al. | ............ | 717/130 |
| 2004/0205726 A1 * | 10/2004 | Chedgey et al. | .............. | 717/125 |
| 2004/0210861 A1 * | 10/2004 | Kucukcakar et al. | ............ | 716/6 |
| 2004/0239674 A1 * | 12/2004 | Ewald et al. | ................... | 345/440 |
| 2006/0095898 A1 * | 5/2006 | Chow et al. | ................... | 717/140 |
| 2006/0206872 A1 * | 9/2006 | Krishnaswamy | ............. | 717/133 |
| 2007/0078886 A1 * | 4/2007 | Rivette et al. | ................. | 707/102 |

* cited by examiner

*Primary Examiner* — Andrew Wang
*Assistant Examiner* — Abderrahim Merouan
(74) *Attorney, Agent, or Firm* — Kilpatrick Townsend & Stockton LLP (57) ABSTRACT

A system traverses a directed cyclic graph to discover a relationship between a first object and a second object, and creates an alias. The alias represents the second object. The system replaces the relationship between the first object and the second object with the created alias, and creates a reference from the first object to the alias.

19 Claims, 9 Drawing Sheets

209 IDENTIFY A STARTING POINT TO BEGIN A TRAVERSAL OF THE DIRECTED CYCLIC GRAPH

210 IDENTIFY A ROOT OF THE DIRECTED CYCLIC GRAPH

OR

211 IDENTIFY A PLURALITY OF STARTING POINTS OF THE DIRECTED CYCLIC GRAPH

212 ORDER THE PLURALITY OF STARTING POINTS OF THE DIRECTED CYCLIC GRAPH TO BEGIN TRAVERSING THE DIRECTED CYCLIC GRAPH BEGINNING WITH A FIRST STARTING POINT OF THE DIRECTED CYCLIC GRAPH, AND ENDING WITH A LAST STARTING POINT OF THE DIRECTED CYCLIC GRAPH

OR

213 IDENTIFY A PLURALITY OF STARTING POINTS OF A PLURALITY OF DIRECTED CYCLIC GRAPHS

214 ORDER THE PLURALITY OF STARTING POINTS OF THE PLURALITY OF DIRECTED CYCLIC GRAPHS

215 ORDER THE PLURALITY OF DIRECTED CYCLIC GRAPHS TO BEGIN TRAVERSING THE PLURALITY OF DIRECTED CYCLIC GRAPHS BEGINNING WITH A FIRST STARTING POINT OF THE FIRST DIRECTED CYCLIC GRAPH, AND ENDING WITH A LAST STARTING POINT OF THE LAST DIRECTED CYCLIC GRAPH

228 PROVIDE A GRAPHICAL USER INTERFACE CAPABLE OF ACCESSING THE SECOND OBJECT

229 RECEIVE A SELECTION FROM A USER TO PERFORM AN ACTION ON THE ALIAS

230 PERFORM THE ACTION ON THE SECOND OBJECT REPRESENTED BY THE ALIAS

231 PERFORM THE ACTION ON AT LEAST ONE ALIAS REPRESENTING THE SECOND OBJECT

OR

232 PROVIDE AN OVERRIDE FEATURE ON THE ALIAS TO OVERRIDE THE ALIAS

*FIG. 9*

METHODS AND APPARATUS FOR USING ALIASES TO DISPLAY LOGIC

BACKGROUND

Conventional computerized devices, such as personal computers, laptop computers, and the like utilize graphical user interfaces in applications, such as operating systems, and graphical editors (i.e., web page editors, document editors, etc.) that enable users to quickly provide input and create documents and/or projects using "What You See Is What You Get" (WYSIWYG) technology. In general, using a graphical user interface, a user operates an input device such as a mouse or keyboard to manipulate graphical objects on a computer display. The graphical objects are often represented as icons, and the user can operate an input device such as a mouse to move a mouse pointer onto an icon (i.e., graphically overlapping the icon) on the graphical user interface. By depressing a mouse button, the application (such as the operating system desktop) selects the icon, and if the user maintains the mouse button in a depressed state, the user can drag the icon across the graphical user interface. By releasing the mouse button, the icon is placed on the graphical user interface at the current position of the mouse pointer. Using graphical user interface technology, users can create and update documents (i.e., web pages, brochures, etc) and/or projects, such as a editing a Digital Video Disk (DVD), by dragging and dropping graphical objects (i.e., video clips, etc) into the project. A DVD project is produced by linking together video clips in a directed graph that often contains cycles. This is also known as a directed cyclic graph. A cyclic graph is a graph comprised of nodes and node edges, where at least one node is connected to at least one other node.

DVD logic, and nearly every form of interactive animation, is composed of a set of states, or nodes. These states or nodes can be video clips (or menus) that may be connected to any other state or node in the navigation logic through a limited set of user choices available to the user (i.e., the links that connect the nodes or states together). Often, the path of navigation logic results in returning to a previously visited state, thereby forming a cycle.

SUMMARY

Conventional technologies for displaying cyclical graphs, such as when authoring DVD projects, suffer from a variety of deficiencies. In particular, conventional technologies for displaying cyclical graphs are limited in that the entire logic of the cyclical graph is difficult to present. At the same time, conventional technologies for displaying cyclical graphs are limited in that one cannot organize the interconnection of states in the logic structure in such a way that keeps the representation easy to understand while editing the set of connections.

Embodiments disclosed herein significantly overcome such deficiencies and provide a system that includes a computer system executing a logic displaying process that traverses a directed cyclical graph, and converts repeated nodes to aliases thus breaking cycles and converting the directed cyclic graph into a directed cyclic graph in which any two nodes are connected by exactly one path. The logic displaying process traverses a directed cyclical graph, breadth first, beginning at a determined starting node in the cyclical graph. The logic displaying process maintains a list of visited nodes. The logic displaying process compares each node discovered against the list of visited nodes. If the node is not on the list, the logic displaying process adds that node to the list. If the node is on the list, the logic displaying process creates an alias to represent the node, replaces the node with the alias, and creates a reference to that alias. The alias of the node represents the original node except that it does not present any out-going edges. The logic displaying process provides a graphical user interface capable of accessing the alias. When a user accesses the alias, also accessed are the object represented by that alias, and any other aliases also representing that object. Thus, a user modifying an alias, is also modifying the object represented by that alias, and any other aliases also representing that object.

The logic displaying process traverses a directed cyclic graph to discover a relationship between a first object and a second object, and then creates an alias. The alias represents the second object. The logic displaying process replaces the relationship between the first object and the second object with the created alias, and creates a reference from the first object to the alias. The logic displaying process provides a graphical user interface capable of accessing the second object.

During an example operation of one embodiment, suppose a user, such as an animation engineer, is creating a DVD project comprised of video clips, within a DVD authoring tool. The DVD project is created by cyclically linking the various video clips and menus together. The DVD project has a root of the directed cyclical graph, called DVD First Play, where the DVD automatically begins to play when the DVD is inserted into a DVD player. The logic displaying process traverses the DVD project, breadth first, starting at First Play, to discover nodes (i.e., the video clips and menus that comprise the DVD project). While traversing the DVD project, the logic displaying process maintains a list of all nodes visited. As each node is encountered, the logic displaying process compares that node against the list of nodes. If the node is not on the list, the logic displaying process adds that node to the list. If the node is already on the list, the logic displaying process creates an alias of that node. The alias represents the node, but does not present out-going links. The logic displaying process replaces the node with the created alias, and creates a reference to the alias. The logic displaying process provides a graphical user interface capable of accessing the second object. If the animation engineer accesses and modifies the alias, the animation engineer is also modifying the node represented by the alias and any other aliases that represent that node. In other words, when the animation engineer modifies an alias representing a video clip, the video clip and any other aliases representing that video clip, are also modified.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by Adobe Systems, Inc., of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein include methods and a computer system that perform a logic displaying process that traverses a directed cyclical graph, and converts repeated nodes to aliases. The logic displaying process traverses a directed cyclical graph, breadth first, beginning at a determined starting node in the directed cyclical graph. The logic displaying process maintains a list of visited nodes, and compares each node the logic displaying process discovers against the list of visited nodes. If the node is not on the list, the logic displaying process adds that node to the list. If the node is on the list, the logic displaying process creates an alias to represent the node, replaces the node with the alias, and creates a reference to that alias. The logic displaying process provides a graphical user interface capable of accessing the alias. When a user accesses the alias, also accessed are the object represented by that alias, and any other aliases also representing that object. Thus, a user modifying an alias, is also modifying the object represented by that alias, and any other aliases also representing that object.

The logic displaying process traverses a directed cyclic graph to discover a relationship between a first object and a second object, and then creates an alias. The alias represents the second object. The logic displaying process replaces the relationship between the first object and the second object with the created alias, and creates a reference from the first object to the alias. The logic displaying process provides a graphical user interface capable of accessing the second object.

Figure 1:
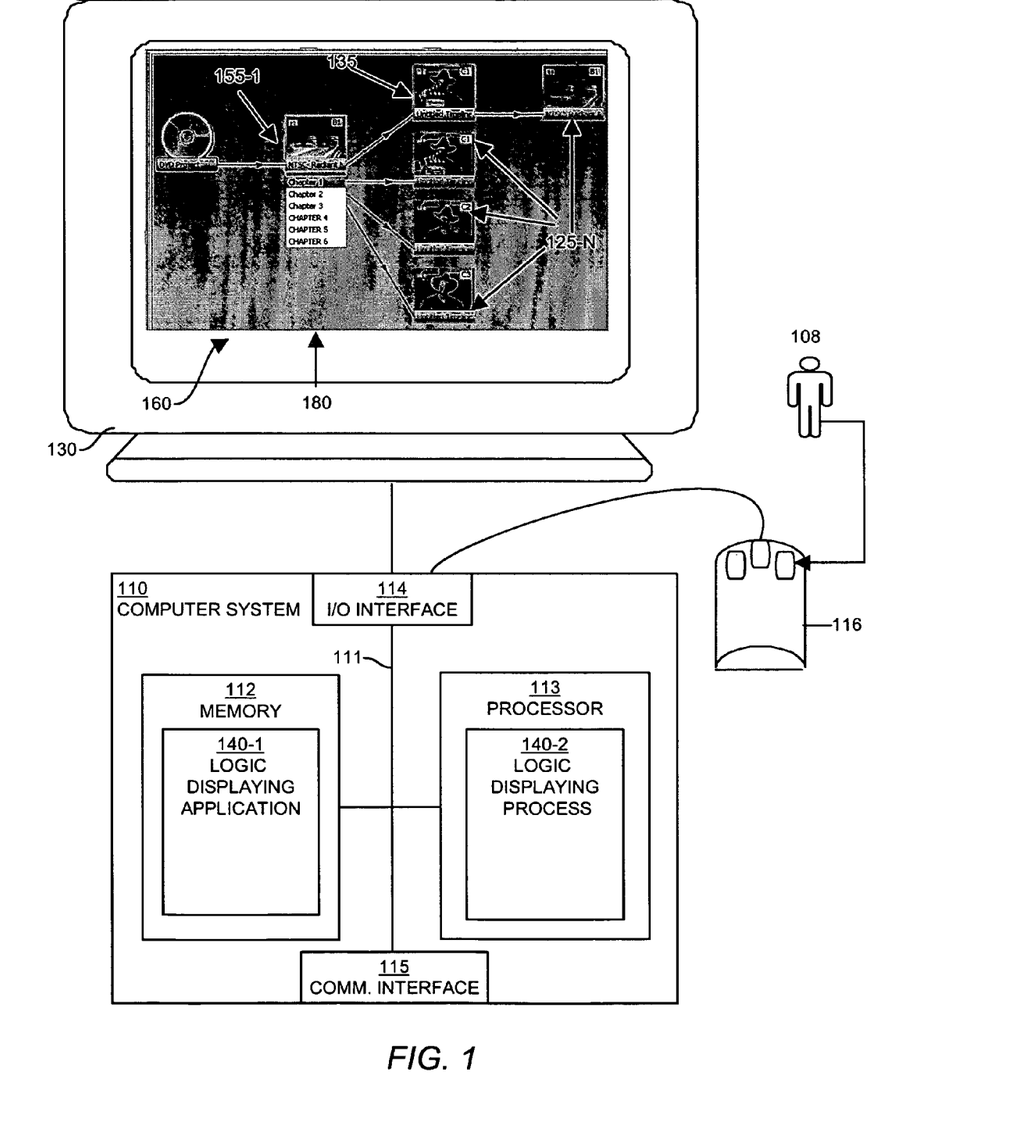
FIG. 1 shows a high-level block diagram of a computer system according to one embodiment disclosed herein.

FIG. 1 is a block diagram illustrating example architecture of a computer system 110 that executes, runs, interprets, operates or otherwise performs a logic displaying application 140-1 and logic displaying process 140-2 suitable for use in explaining example configurations, according to one embodiment disclosed herein. The computer system 110 may be any type of computerized device such as a personal computer, workstation, portable computing device, console, laptop, network terminal or the like. An input device 116 (e.g., one or more user/developer controlled devices such as a keyboard, mouse, etc.) couples to processor 113 through I/O interface 114, and enables a user 108 to provide input commands, and generally control the graphical user interface 160 that the logic displaying application 140-1 and process 140-2 provides on the display 130. The graphical user interface 160 displays a DVD authoring project 180 containing a starting point 155-1, a first object 135 and aliases 125-N. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a logic displaying application 140-1 as explained herein. The logic displaying application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the logic displaying application 140-1. Execution of the logic displaying application 140-1 in this manner produces processing functionality in a logic displaying process 140-2. In other words, the logic displaying process 140-2 represents one or more portions or runtime instances of the logic displaying application 140-1 (or the entire logic displaying application 140-1) performing or executing within or upon the processor 113 in the computerized device 110 at runtime.

It is noted that example configurations disclosed herein include the logic displaying application 140-1 itself (i.e., in the form of un-executed or non-performing logic instructions and/or data). The logic displaying application 140-1 may be stored on a computer readable medium (such as a floppy disk), hard disk, electronic, magnetic, optical, or other computer readable medium. The logic displaying application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the logic displaying application 140-1 in the processor 113 as the logic displaying process 140-2. Those skilled in the art will understand that the computer system 110 may include other processes and/or software and hardware components, such as an operating system not shown in this example.

A display 130 need not be coupled directly to computer system 110. For example, the logic displaying application 140-1 can be executed on a remotely accessible computerized device via the network interface 115. In this instance, the graphical user interface 160 may be displayed locally to a user 108 of the remote computer and execution of the processing herein may be client-server based.

Figure 2:
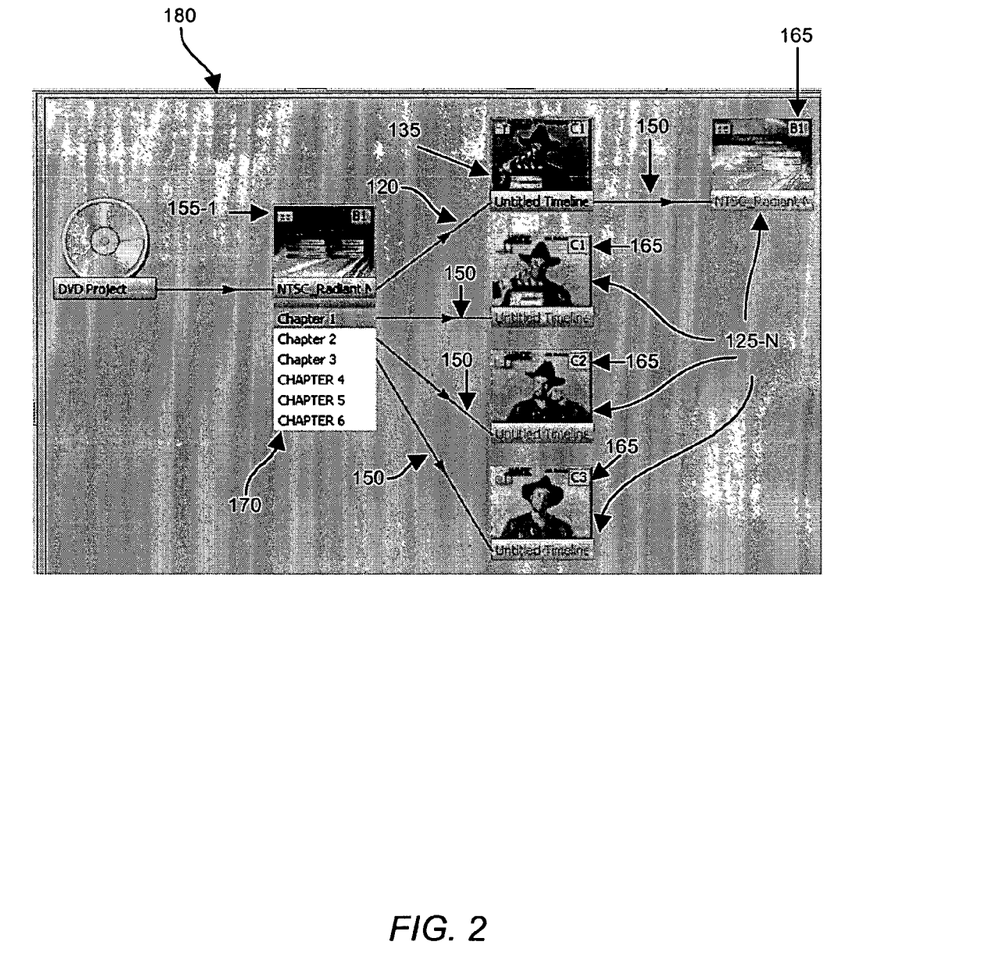
FIG. 2 shows an example screenshot of a DVD project displayed using aliases, according to one embodiment disclosed herein.

FIG. 2 is an example screen shot of a DVD authoring project 180 containing a starting point 155-1. The starting point 155-1 contains a display list 170. A relationship 120 exists between the starting point 155-1 and a first object 135. A relationship 120 is a link from a first object 135 and a second object 145. References 150 exist between the starting point 155-1, and respective aliases 125-N. References 150 also exist between the first object 135 and respective aliases 125-N. Each of the aliases 125-N contains information 165 associated with the display list 170.

Figure 3:
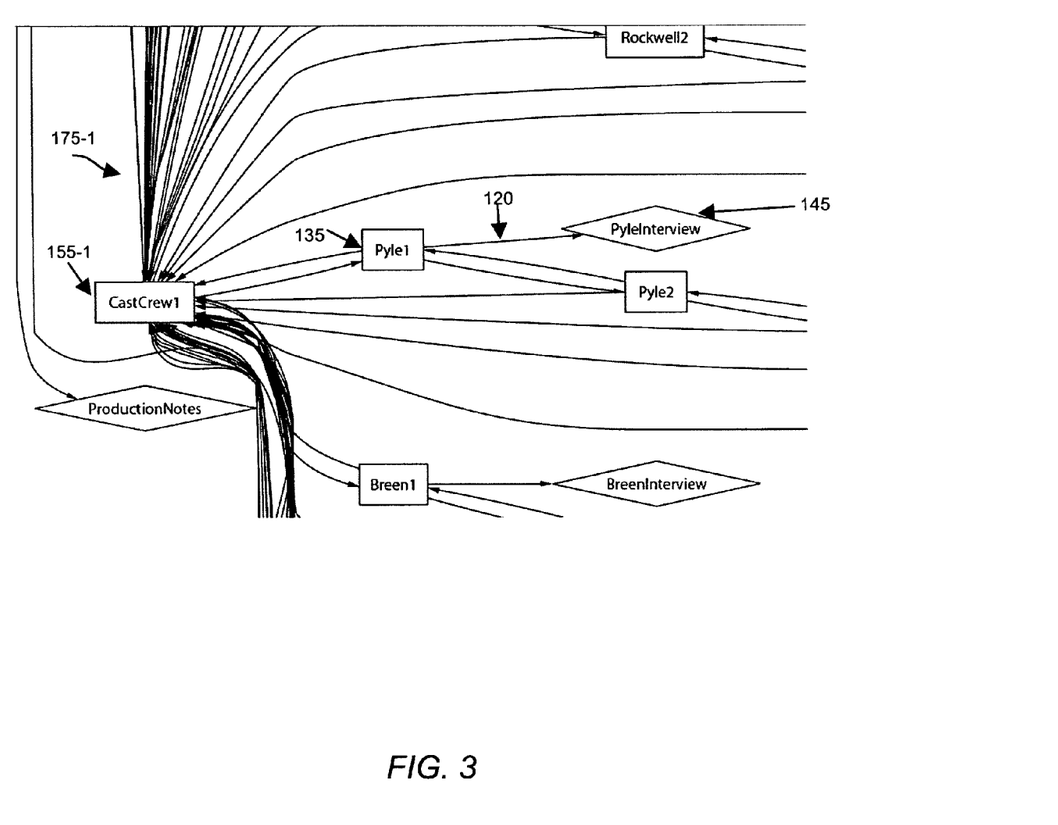
FIG. 3 shows an view of an example screenshot of a DVD project displaying a cyclical graph, according to one embodiment disclosed herein.

FIG. 3 is a view of the example cyclical graph containing directed cyclic graph 175-1. The directed cyclic graph 175-1 contains a starting point 155-1. A relationship 120 exists between a first object 135 and a second object 145.

Further details of configurations explained herein will now be provided with respect to a flow chart of processing steps that show the high level operations disclosed herein to perform the logic displaying process 140-2.

Figure 4:
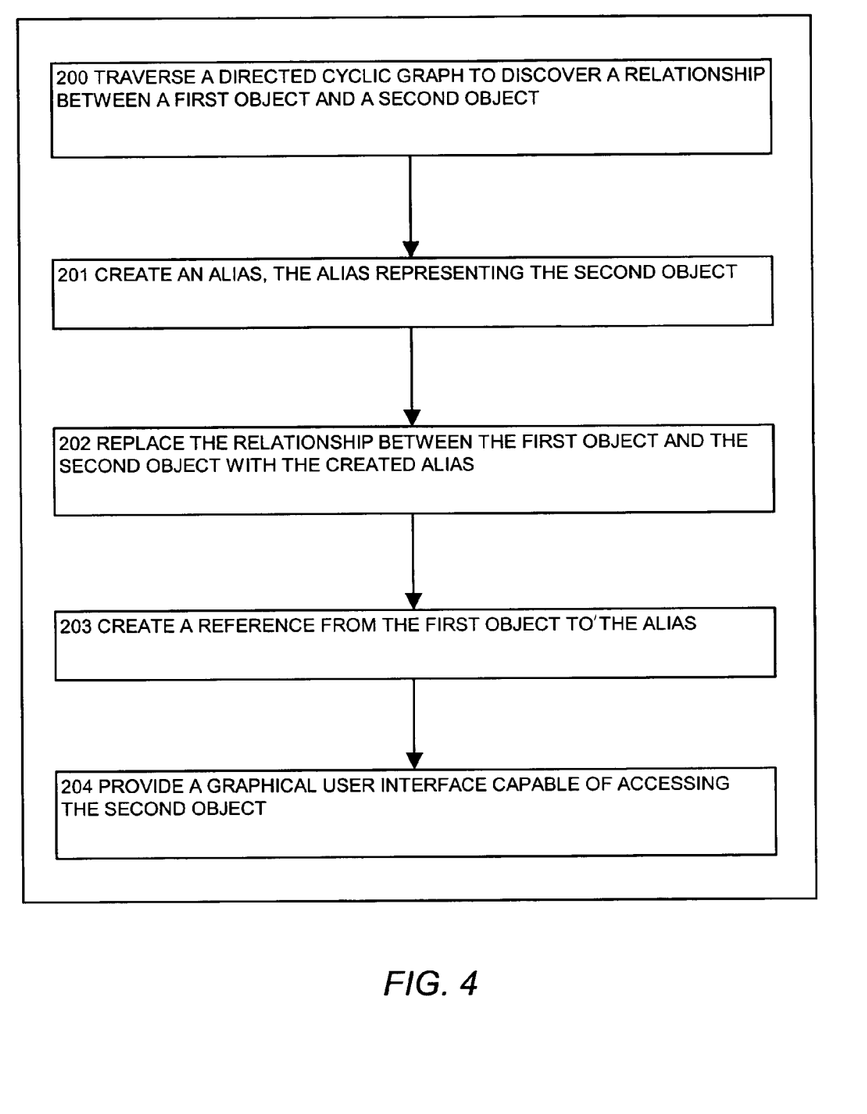
FIG. 4 illustrates a flowchart of a procedure performed by the system of FIG. 1 when the logic displaying process traverses a directed cyclic graph to discover a relationship between a first object and a second object, according to one embodiment disclosed herein.

FIG. 4 is an embodiment of the steps performed by the logic displaying process 140-2 when it traverses a directed cyclic graph 175-1 to discover a relationship 120 between a first object 135 and a second object 145.

In step 200, the logic displaying process 140-2 traverses a directed cyclic graph 175-1 to discover a relationship 120 between a first object 135 and a second object 145. In an example embodiment, a DVD authoring project 180 displays the contents of the DVD as a cyclical graph containing a starting point 155-1 (i.e., the root) of a directed cyclic graph 175-1. The directed cyclic graph 175-1 contains video clips linked together. For example, the directed cyclic graph 175-1 contains a first video clip (i.e., a first object 135) linked to a second video clip (i.e., a second object 145). The link between the first video clip (i.e., a first object 135), and the second video clip (i.e., a second object 145) is represented as a relationship 120 between the first video clip (i.e., a first object 135), and the second video clip (i.e., a second object 145). The different video clips can represent various sections of the DVD. For example, the first video clip (i.e., a first object 135) can represent an interview with one of the actors on the DVD. The second video clip (i.e., the second object 145) can represent a section of the DVD where the actor performs a stunt. Thus, the relationship 120 between the first video clip (i.e., a first object 135), and the second video clip (i.e., a second object 145) is a transition from an interview with the actor (i.e., a first object 135) to a video clip of the actor performing a stunt (i.e., a first object 135).

In step 201, the logic displaying process 140-2 creates an alias 125-1, the alias 125-1 representing the second object 145. In an example embodiment, a DVD authoring project 180 displays the contents of the DVD as a cyclical graph containing, for example, a first video clip (i.e., a first object 135) linked to a second video clip (i.e., a second object 145). The logic displaying process 140-2 traverses the directed cyclic graph 175-1, and discovers a relationship 120 between, for example, the first video clip (i.e., a first object 135), and the second video clip (i.e., a second object 145). The logic displaying process 140-2 creates an alias 125-1 that represents the second video clip (i.e., a second object 145).

In step 202, the logic displaying process 140-2 replaces the relationship 120 between the first object 135 and the second object 145 with the created alias 125-1. In an example embodiment, a DVD authoring project 180 displays the contents of the DVD as a cyclical graph containing, for example, a first video clip (i.e., a first object 135) linked to a second video clip (i.e., a second object 145). As the logic displaying process 140-2 traverses the directed cyclic graph 175-1, the logic displaying process discovers a relationship 120 between, for example, the first video clip (i.e., a first object 135), and the second video clip (i.e., a second object 145). The logic displaying process 140-2 creates an alias 125-1 that represents the second video clip (i.e., a second object 145), and replaces the relationship 120 with the alias 125-1 that represents the second video clip (i.e., a second object 145).

In step 203, the logic displaying process 140-2 creates a reference 150 from the first object 135 to the alias 125-1. In an example embodiment, a DVD authoring project 180 displays the contents of the DVD as a cyclical graph containing, for example, a first video clip (i.e., a first object 135) linked to a second video clip (i.e., a second object 145). As the logic displaying process 140-2 traverses the directed cyclic graph 175-1, the logic displaying process discovers a relationship 120 between, for example, the first video clip (i.e., a first object 135), and the second video clip (i.e., a second object 145). The logic displaying process 140-2 creates an alias 125-1 that represents the second video clip (i.e., a second object 145), and replaces the relationship 120 with the alias 125-1 that represents the second video clip (i.e., a second object 145). The logic displaying process 140-2 then creates a reference 150 from the first video clip (i.e., a first object 135) to the alias 125-1. The reference 150 indicates a relationship 120 existed between the first video clip (i.e., a first object 135), and the alias 125-1 that represents the second video clip (i.e., a second object 145).

In step 204, the logic displaying process 140-2 provides a graphical user interface 160 capable of accessing the second object 145. In an example configuration, a DVD authoring tool operates within a graphical user interface 160. A user 108, such as an animation engineer, arranges video clips according to a timeline, and interconnects various video clips to create the finished DVD. The DVD can have a menu (i.e., a display list 170) indicating various starting points, for example, in the case of a musical DVD, where the DVD can be started at the beginning of each song. A DVD of movie clips can have a list of menu (i.e., a display list 170) items indicating, for example, the start of the movie, interviews with various actors in the movie, video clips of outtakes captured during filming of the movie, etc.

In an example embodiment, a DVD authoring project 180 displays the contents of the DVD as a cyclical graph containing, for example, a first video clip (i.e., a first object 135) linked to a second video clip (i.e., a second object 145). The logic displaying process 140-2 traverses the directed cyclic graph 175-1, discovers a relationship 120 between, for example, the first video clip (i.e., a first object 135), and the second video clip (i.e., a second object 145), and creates an alias 125-1 that represents the second video clip (i.e., a second object 145). The logic displaying process 140-2 replaces the relationship 120 with the alias 125-1 that represents the second video clip (i.e., a second object 145), and creates a reference 150 from the first video clip (i.e., a first object 135) to the alias 125-1. The animation engineer (i.e., the user 108), via DVD authoring project 180 the graphical user interface 160, can access the second video clip (i.e., a second object 145), or the alias 125-1 representing the second video clip (i.e., a second object 145) to modify the second video clip (i.e., a second object 145).

Figure 5:
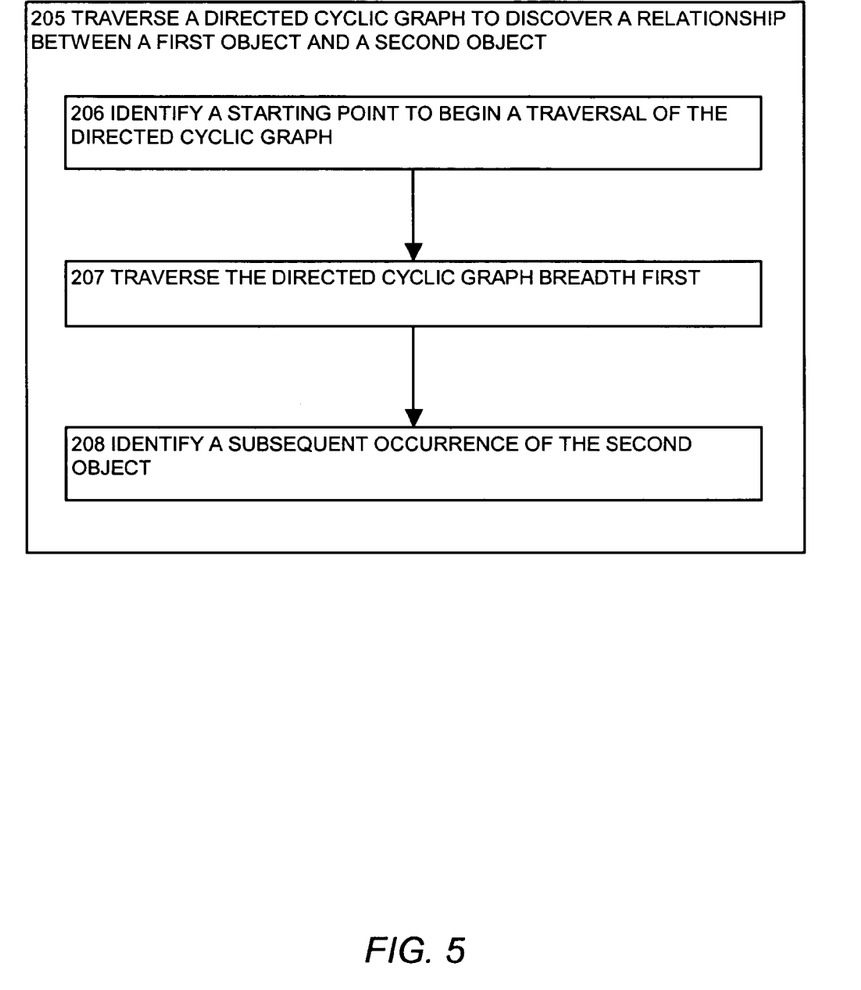
FIG. 5 illustrates a flowchart of a procedure performed by the system of FIG. 1 when the logic displaying process traverses a directed cyclic graph to discover a relationship between a first object and a second object, including identifying a starting point, according to one embodiment disclosed herein.

FIG. 5 is an embodiment of the steps performed by the logic displaying process 140-2 when it traverses a directed cyclic graph 175-1 to discover a relationship 120 between a first object 135 and a second object 145, and identifies a starting point 155-1 to begin traversal of the directed cyclic graph 175-1.

In step 205, the logic displaying process 140-2 traverses a directed cyclic graph 175-1 to discover a relationship 120 between a first object 135 and a second object 145. In an example embodiment, a DVD authoring project 180 displays the contents of the DVD as a cyclical graph containing a starting point 155-1 (i.e., the root) of a directed cyclic graph 175-1. The directed cyclic graph 175-1 contains video clips linked together. For example, the directed cyclic graph 175-1 contains a first video clip (i.e., a first object 135) linked to a second video clip (i.e., a second object 145). The link between the first video clip (i.e., a first object 135), and the second video clip (i.e., a second object 145) is represented as a relationship 120 between the first video clip (i.e., a first object 135), and the second video clip (i.e., a second object 145). The different video clips can represent various sections of the DVD. For example, the first video clip (i.e., a first object 135) can represent an interview with one of the actors on the DVD. The second video clip (i.e., the second object 145) can represent a section of the DVD where the actor performs a stunt. Thus, the relationship 120 between the first video clip (i.e., a first object 135), and the second video clip (i.e., a second object 145) is a transition from an interview with the actor (i.e., a first object 135) to a video clip of the actor performing a stunt (i.e., a first object 135).

In step 206, the logic displaying process 140-2 identifies a starting point 155-1 to begin a traversal of the directed cyclic graph 175-1. In an example embodiment, a DVD authoring project 180 displays the contents of the DVD as a cyclical graph. The directed cyclic graph 175-1 contains video clips linked together. For example, the directed cyclic graph 175-1 contains a first video clip (i.e., a first object 135) linked to a second video clip (i.e., a second object 145). The link between the first video clip (i.e., a first object 135), and the second video clip (i.e., a second object 145) is represented as a relationship 120 between the first video clip (i.e., a first object 135), and the second video clip (i.e., a second object 145). The directed cyclic graph 175-1 contains a starting point 155-1 (i.e., the root) of a directed cyclic graph 175-1. In an example configuration, when a viewer inserts a DVD into a DVD player, the DVD begins at a pre-defined location (i.e., the starting point 155-1) on the DVD. This pre-defined location (i.e., the starting point 155-1) is commonly referred to as DVD First Play. Thus, the logic displaying process 140-2 identifies the DVD First play (i.e., the starting point 155-1) to begin a traversal of the directed cyclic graph 175-1.

In step 207, the logic displaying process 140-2 traverses the directed cyclic graph 175-1, breadth first. In an example embodiment, a DVD authoring project 180 displays the contents of the DVD as a cyclical graph. The directed cyclic graph 175-1 contains video clips linked together. For example, the directed cyclic graph 175-1 contains a first video clip (i.e., a first object 135) linked to a second video clip (i.e., a second object 145). The link between the first video clip (i.e., a first object 135), and the second video clip (i.e., a second object 145) is represented as a relationship 120 between the first video clip (i.e., a first object 135), and the second video clip (i.e., a second object 145). The directed cyclic graph 175-1 contains a starting point 155-1 (i.e., the root) of a directed cyclic graph 175-1. In an example configuration, when a viewer inserts a DVD into a DVD player, the DVD begins at a pre-defined location (i.e., the starting point 155-1), for example, DVD First Play. The logic displaying process 140-2 identifies the DVD First play (i.e., the starting point 155-1), and traverses the directed cyclic graph 175-1 breadth first. In another embodiment, the logic displaying process 140-2 identifies the DVD First play (i.e., the starting point 155-1), and traverses the directed cyclic graph 175-1 depth first.

In step 208, the logic displaying process 140-2 identifies a subsequent occurrence of the second object 145. In an example embodiment, a DVD authoring project 180 displays the contents of the DVD as a cyclical graph containing a starting point 155-1 (i.e., the root) of a directed cyclic graph 175-1. The directed cyclic graph 175-1 contains video clips linked together. For example, the directed cyclic graph 175-1 contains a first video clip (i.e., a first object 135) linked to a second video clip (i.e., a second object 145). The link between the first video clip (i.e., a first object 135), and the second video clip (i.e., a second object 145) is represented as a relationship 120 between the first video clip (i.e., a first object 135), and the second video clip (i.e., a second object 145). The different video clips can represent various sections of the DVD. For example, the first video clip (i.e., a first object 135) can represent an interview with one of the actors on the DVD. The second video clip (i.e., the second object 145) can represent a section of the DVD where the actor performs a stunt. Thus, the relationship 120 between the first video clip (i.e., a first object 135), and the second video clip (i.e., a second object 145) is a transition from an interview with the actor (i.e., a first object 135) to a video clip of the actor performing a stunt (i.e., a first object 135).

In an example configuration, the second video clip (i.e., a second object 155) has a display list 170, identifying various sections (i.e., a first section on the display list 170, a second section on the display list 170, etc) of the second video clip (i.e., a second object 145). The DVD authoring project 180 can create a relationship 120 between the first video clip (i.e., a first object 135) and the second video clip (i.e., the second object 145), with second video clip (i.e., a second object 145) starting at the first section on the display list 170. The DVD authoring project 180 can create a relationship 120 between the second video clip (i.e., a second object 145) and third video clip (i.e., a third object, not shown), with second video clip (i.e., a second object 145) starting at the second section on the display list 170. As the logic displaying process 140-2 traverses the directed cyclic graph 175-1, breadth first, and identifies the second video clip (i.e., a second object 145) linked to the first video clip (i.e., the first object 135), at the first section on the display list 170 of the second video clip (i.e., a second object 145). The logic displaying process 140-2 identifies this instance of the second video clip (i.e., a second object 145) as the first occurrence of the second video clip (i.e., a second object 145). The logic displaying process 140-2 continues to traverse the directed cyclic graph 175-1, and identifies the second video clip (i.e., a second object 145) linked the third video clip (i.e., the third object, not shown), at the second section on the display list 170 of the second video clip (i.e., a second object 145). Thus, the logic displaying process 140-2 identifies the second video clip (i.e., a second object 145) linked the third video clip (i.e., the third object, not shown) as a subsequent occurrence of the second video clip (i.e., the second object 145).

Figure 6:
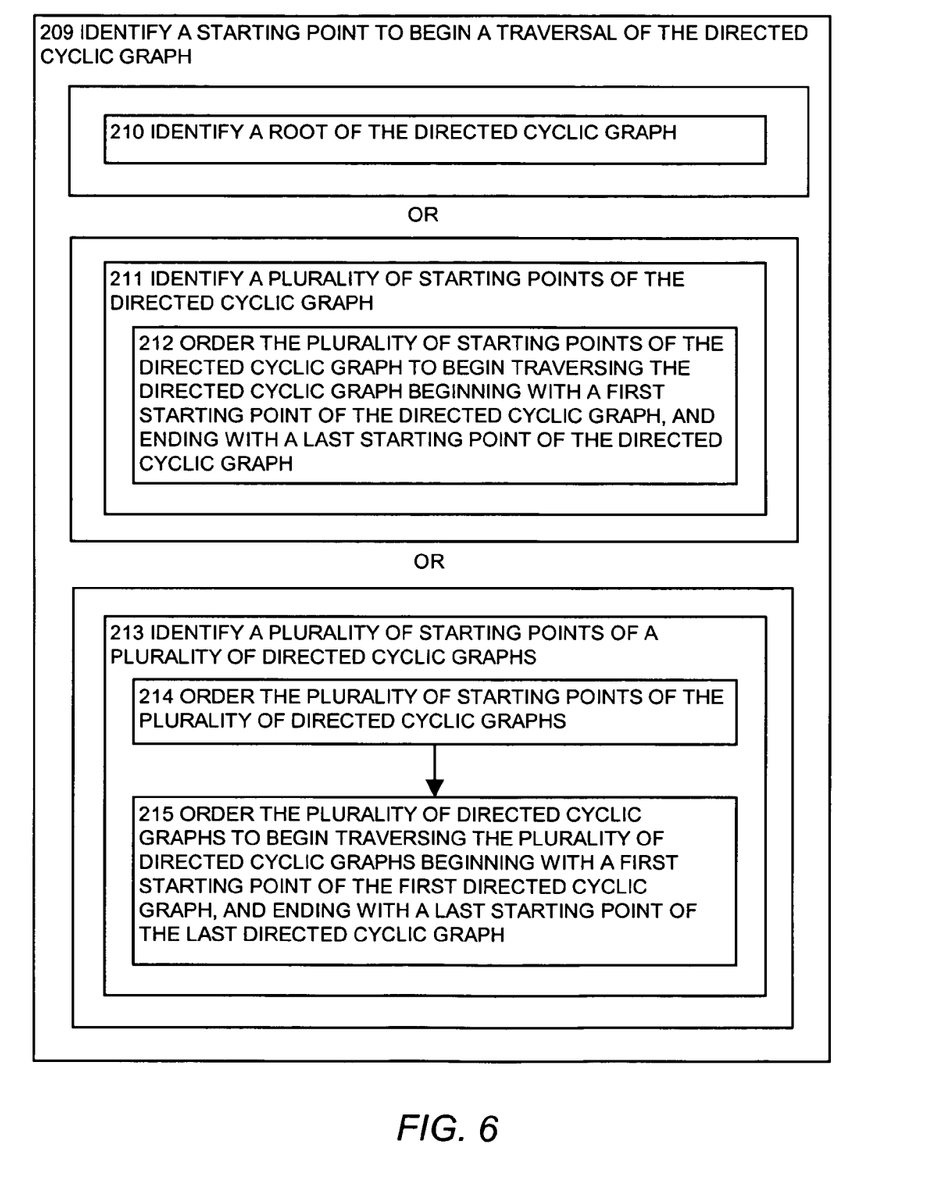
FIG. 6 illustrates a flowchart of a procedure performed by the system of FIG. 1 when the logic displaying process identifies a starting point to begin a traversal of the directed cyclic graph, according to one embodiment disclosed herein.

FIG. 6 is an embodiment of the steps performed by the logic displaying process 140-2 when it identifies a starting point 155-1 to begin a traversal of the directed cyclic graph 175-1.

In step 209, the logic displaying process 140-2 identifies a starting point 155-1 to begin a traversal of the directed cyclic graph 175-1. In an example embodiment, a DVD authoring project 180 displays the contents of the DVD as a cyclical graph. The directed cyclic graph 175-1 contains video clips linked together. For example, the directed cyclic graph 175-1 contains a first video clip (i.e., a first object 135) linked to a second video clip (i.e., a second object 145). The link between the first video clip (i.e., a first object 135), and the second video clip (i.e., a second object 145) is represented as a relationship 120 between the first video clip (i.e., a first object 135), and the second video clip (i.e., a second object 145). The directed cyclic graph 175-1 contains a starting point 155-1 (i.e., the root) of a directed cyclic graph 175-1. In an example configuration, when a viewer inserts a DVD into a DVD player, the DVD begins at a pre-defined location (i.e., the starting point 155-1) on the DVD. This pre-defined location (i.e., the starting point 155-1) is commonly referred to as DVD First Play. Thus, the logic displaying process 140-2 identifies the DVD First play (i.e., the starting point 155-1) to begin a traversal of the directed cyclic graph 175-1.

In step 210, the logic displaying process 140-2 identifies a root of the directed cyclic graph 175-1. In an example embodiment, a DVD authoring project 180 displays the contents of the DVD as a cyclical graph. The directed cyclic graph 175-1 contains video clips linked together. In one embodiment, the directed cyclic graph 175-1 contains a root (i.e., a starting point 155-1) of the directed cyclic graph 175-1. Thus, the logic displaying process 140-2 identifies a root of the directed cyclic graph 175-1.

In step 211, the logic displaying process 140-2 identifies a plurality of starting points 155-N of the directed cyclic graph 175-1. In an example embodiment, a DVD authoring project 180 displays the contents of the DVD as a cyclical graph. The directed cyclic graph 175-1 contains a plurality of starting points 155-N of the directed cyclic graph 175-1. Thus, the logic displaying process 140-2 identifies a plurality of starting points 155-N of the directed cyclic graph 175-1.

In step 212, the logic displaying process 140-2 orders the plurality of starting points 155-N of the directed cyclic graph 175-1 to begin traversing the directed cyclic graph 175-1 beginning with a first starting point 155-1 of the directed cyclic graph 175-1, and ending with a last starting point 155-N of the directed cyclic graph 175-1. In an example embodiment, a DVD authoring project 180 displays the contents of the DVD as a cyclical graph. The directed cyclic graph 175-1 contains video clips linked together. For example, the directed cyclic graph 175-1 contains a first video clip (i.e., a first object 135) linked to a second video clip (i.e., a second object 145). The link between the first video clip (i.e., a first object 135), and the second video clip (i.e., a second object 145) is represented as a relationship 120 between the first video clip (i.e., a first object 135), and the second video clip (i.e., a second object 145). The directed cyclic graph 175-1 contains a plurality of starting points 155-N of the directed cyclic graph 175-1 identified by the logic displaying process 140-2. The logic displaying process 140-2 orders the plurality of starting points 155-N of the directed cyclic graph 175-1, such that starting point 155-1 is first, starting point 155-2 is next, and starting point 155-N is last. The logic displaying process 140-2 identifies the first starting point 155-1, and traverses the directed cyclic graph 175-1 breadth first, beginning with the first starting point 155-1. The logic displaying process 140-2 then traverses the directed cyclic graph 175-1 breadth first, beginning with the second starting point 155-2. The logic displaying process 140-2 continues to traverse the directed cyclic graph 175-1 in this manner until the only starting point remaining is the last starting point 155-N. The logic displaying process 140-2 then traverses the directed cyclic graph 175-1 breadth first, beginning with the last starting point 155-N.

Alternatively, in step 213, the logic displaying process 140-2 identifies a plurality of starting points 155-N of a plurality of directed cyclic graphs 175-N. In one embodiment, the directed cyclic graph 175-1 is comprised of a plurality sub trees. In an example embodiment, a DVD authoring project 180 displays the contents of the DVD as a plurality of cyclical graphs, each graph containing a plurality of starting points 155-N corresponding to each directed cyclic graph 175-N. The directed cyclic graphs 175-N contain video clips linked together. The directed cyclic graphs 175-N may be connected, or there may exist fragment directed cyclic graphs 175-N. Thus, the logic displaying process 140-2 identifies a plurality of starting points 155-N of the plurality of directed cyclic graphs 175-N.

In step 214, the logic displaying process 140-2 orders the plurality of starting points 155-N of the plurality of directed cyclic graphs 175-N. In an example configuration, the plurality of directed cyclic graphs 175-N contain a plurality of starting points 155-N identified by the logic displaying process 140-2. The logic displaying process 140-2 orders the plurality of starting points 155-N of the plurality of directed cyclic graphs 175-N, such that starting point 155-1 of the first directed cyclic graph 175-1 is first, starting point 155-2 of the second directed cyclic graph 175-2 is next, and starting point 155-N of the last directed cyclic graph 175-N is last.

In step 215, the logic displaying process 140-2 orders the plurality of directed cyclic graphs 175-N to begin traversing the plurality of directed cyclic graphs 175-N beginning with a first starting point 155-1 of the first directed cyclic graph 175-1, and ending with a last starting 155-N point of the last directed cyclic graph 175-N. In an example embodiment, a DVD authoring project 180 displays the contents of the DVD as a plurality of cyclical graphs corresponding to a plurality of directed cyclic graphs 175-N. The plurality of directed cyclic graphs 175-N contains video clips linked together. The plurality of directed cyclic graphs 175-N contains a plurality of starting points 155-N of the directed cyclic graph 175-1 identified by the logic displaying process 140-2. The logic displaying process 140-2 orders the plurality of starting points 155-N of the plurality of directed cyclic graphs 175-N, such that starting point 155-1 of the first directed cyclic graph 175-1 is first, the starting point 155-2 of the first directed cyclic graph 175-1 is next, until all the starting points 155-N of the first directed cyclic graph 175-1 have been placed in order. Then the logic displaying process orders the plurality of the starting points 155-N of the second directed cyclic graph 175-1 in the same manner, until all of the starting points 155-N of all of the plurality of directed cyclic graphs 175-N have been ordered for traversal. The logic displaying process 140-2 identifies the first starting point 155-1 of the first directed cyclic graph 175-1, and traverses the directed cyclic graph 175-1 breadth first, beginning with the first starting point 155-1, and ending with the last starting point 155-N of the first directed cyclic graph 175-1. The logic displaying process 140-2 then traverses the second directed cyclic graph 175-1 breadth first, beginning with the first starting point 155-1 of the second directed cyclic graph 175-2 and ending with the last starting point 155-N of the second directed cyclic graph 175-2. The logic displaying process 140-2 continues to traverse the plurality of directed cyclic graphs 175-N in this manner until the only directed cyclic graph 175-N remaining is the last directed cyclic graph 175-N. The logic displaying process 140-2 then traverses the last directed cyclic graph 175-N breadth first, beginning with the first starting point 155-1 and ending with the last starting point 155-N. In an example embodiment, a plurality of directed cyclic graphs 175-N exists. Each directed cyclic graph 175-N has one starting point 155-1. In another example embodiment, a plurality of directed cyclic graphs 175-N exists. Each directed cyclic graph 175-N has a plurality of starting points 155-N.

Figure 7:
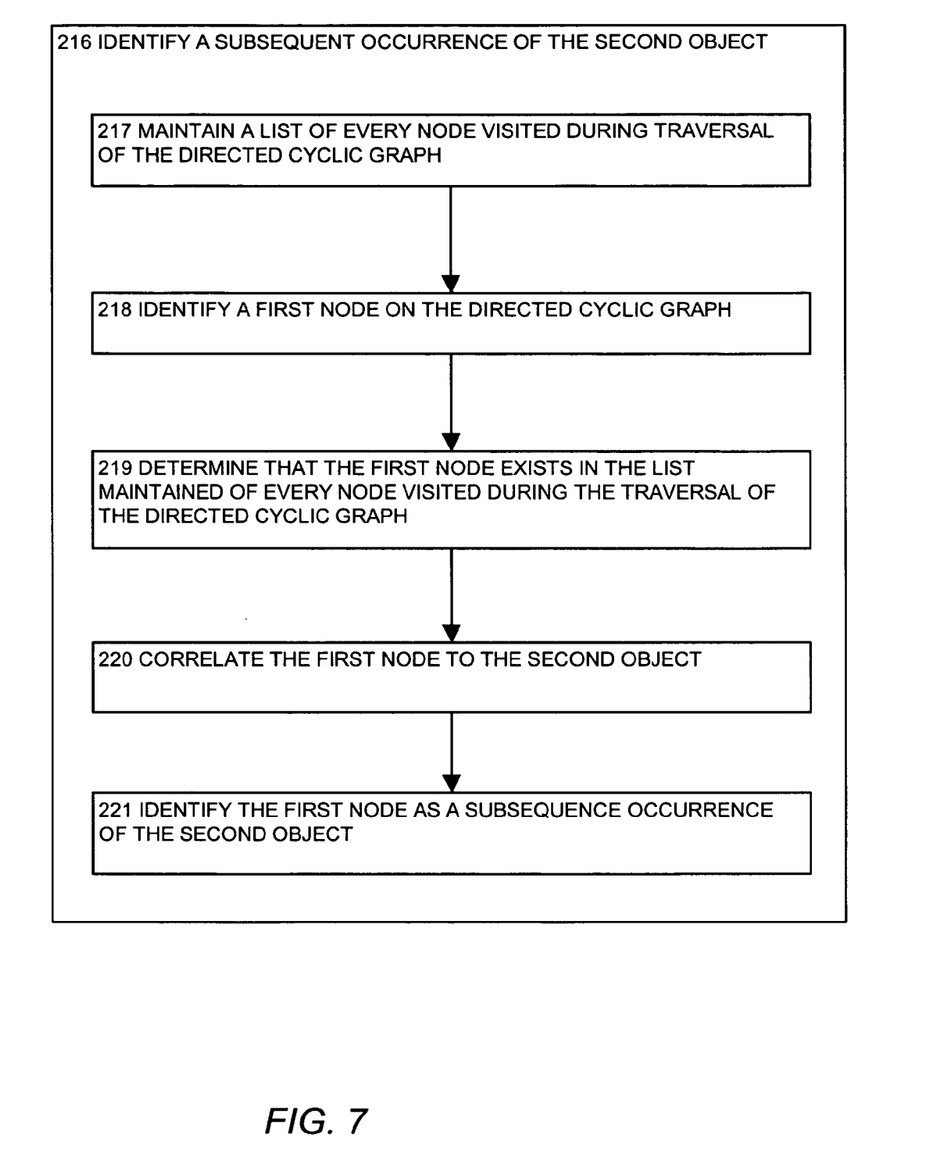
FIG. 7 illustrates a flowchart of a procedure performed by the system of FIG. 1 when the logic displaying process identifies a starting point to begin a traversal of the directed cyclic graph, and maintains a list of every node visited during the traversal of the directed cyclic graph, according to one embodiment disclosed herein.

FIG. 7 is an embodiment of the steps performed by the logic displaying process 140-2 when it identifies a starting point 155-1 to begin a traversal of the directed cyclic graph 175-1, maintaining a list of every node visited during traversal of the directed cyclic graph 175-1.

In step 216, the logic displaying process 140-2 identifies a subsequent occurrence of the second object 145. In an example embodiment, a DVD authoring project 180 displays the contents of the DVD as a cyclical graph containing a starting point 155-1 (i.e., the root) of a directed cyclic graph 175-1. The directed cyclic graph 175-1 contains video clips linked together. For example, the directed cyclic graph 175-1 contains a first video clip (i.e., a first object 135) linked to a second video clip (i.e., a second object 145). The link between the first video clip (i.e., a first object 135), and the second video clip (i.e., a second object 145) is represented as a relationship 120 between the first video clip (i.e., a first object 135), and the second video clip (i.e., a second object 145). The different video clips can represent various sections of the DVD. For example, the first video clip (i.e., a first object 135) can represent an interview with one of the actors on the DVD. The second video clip (i.e., the second object 145) can represent a section of the DVD where the actor performs a stunt. Thus, the relationship 120 between the first video clip (i.e., a first object 135), and the second video clip (i.e., a second object 145) is a transition from an interview with the actor (i.e., a first object 135) to a video clip of the actor performing a stunt (i.e., a first object 135).

In an example configuration, the second video clip (i.e., a second object 155) has a display list 170, identifying various sections (i.e., a first section on the display list 170, a second section on the display list 170, etc) of the second video clip (i.e., a second object 145). The DVD authoring project 180 can create a relationship 120 between the first video clip (i.e., a first object 135) and the second video clip (i.e., the second object 145), with second video clip (i.e., a second object 145) starting at the first section on the display list 170. The DVD authoring project 180 can create a relationship 120 between the second video clip (i.e., a second object 145) and third video clip (i.e., a third object, not shown), with second video clip (i.e., a second object 145) starting at the second section on the display list 170. As the logic displaying process 140-2 traverses the directed cyclic graph 175-1, breadth first, and identifies the second video clip (i.e., a second object 145) linked to the first video clip (i.e., the first object 135), at the first section on the display list 170 of the second video clip (i.e., a second object 145). The logic displaying process 140-2 identifies this instance of the second video clip (i.e., a second object 145) as the first occurrence of the second video clip (i.e., a second object 145). The logic displaying process 140-2 continues to traverse the directed cyclic graph 175-1, and identifies the second video clip (i.e., a second object 145) linked the third video clip (i.e., the third object, not shown), at the second section on the display list 170 of the second video clip (i.e., a second object 145). Thus, the logic displaying process 140-2 identifies the second video clip (i.e., a second object 145) linked the third video clip (i.e., the third object, not shown) as a subsequent occurrence of the second video clip (i.e., the second object 145).

In step 217, the logic displaying process 140-2 maintains a list of every node visited during traversal of the directed cyclic graph 175. In an example embodiment, a DVD authoring project 180 displays the contents of the DVD as a cyclical graph containing a starting point 155-1 of a directed cyclic graph 175-1. The directed cyclic graph 175-1 contains video clips linked together, such as a first video clip (i.e., a first object 135) and a second video clip (i.e., the second object 145). The first video clip (i.e., a first object 135) and the second video clip (i.e., the second object 145) are represented as nodes on the directed cyclic graph 175-1. The logic displaying process 140-2 traverses the directed cyclic graph 175-1, breadth first, to visit every node on the directed cyclic graph 175-1. As the logic displaying process 140-2 traverses the directed cyclic graph 175-1, the logic displaying process 140-2 maintains a list of every node (i.e., the first object 135, the second object 145, etc.) visited during the traversal of the directed cyclic graph 175-1.

In step 218, the logic displaying process 140-2 identifies a first node on the directed cyclic graph 175-1. In an example configuration, the second video clip (i.e., a second object 155) has a display list 170, identifying various sections (i.e., a first section on the display list 170, a second section on the display list 170, etc) of the second video clip (i.e., a second object 145). The DVD authoring project 180 can create a relationship 120 between the first video clip (i.e., a first object 135) and the second video clip (i.e., the second object 145), with second video clip (i.e., a second object 145) starting at the first section on the display list 170. As the logic displaying process 140-2 traverses the directed cyclic graph 175-1, breadth first, and identifies the second video clip (i.e., a second object 145) linked to the first video clip (i.e., the first object 135), at the first section on the display list 170 of the second video clip (i.e., a second object 145), as the first node on the directed cyclic graph 175-1.

In step 219, the logic displaying process 140-2 determines that the first node exists in the list maintained of every node visited during the traversal of the directed cyclic graph 175-1. In an example configuration, the second video clip (i.e., a second object 155) has a display list 170, identifying various sections (i.e., a first section on the display list 170, a second section on the display list 170, etc) of the second video clip (i.e., a second object 145). The DVD authoring project 180 can create a relationship 120 between the first video clip (i.e., a first object 135) and the second video clip (i.e., the second object 145), with second video clip (i.e., a second object 145) starting at the first section on the display list 170. As the logic displaying process 140-2 traverses the directed cyclic graph 175-1, the logic displaying process 140-2 maintains a list of every node (i.e., the first object 135, the second object 145, etc.) visited during the traversal of the directed cyclic graph

175-1. The logic displaying process 140-2 traverses the directed cyclic graph 175-1, breadth first, and identifies the second video clip (i.e., a second object 145) linked to the first video clip (i.e., the first object 135), at the first section on the display list 170 of the second video clip (i.e., a second object 145), as the first node on the directed cyclic graph 175-1. The logic displaying process 140-2 determines that this first node exists on the list of every node visited during the traversal of the directed cyclic graph 175-1.

In step 220, the logic displaying process 140-2 correlates the first node to the second object 145. In an example configuration, the second video clip (i.e., a second object 155) has a display list 170, identifying various sections (i.e., a first section on the display list 170, a second section on the display list 170, etc) of the second video clip (i.e., a second object 145). The DVD authoring project 180 can create a relationship 120 between the first video clip (i.e., a first object 135) and the second video clip (i.e., the second object 145), with second video clip (i.e., a second object 145) starting at the first section on the display list 170. As the logic displaying process 140-2 traverses the directed cyclic graph 175-1, the logic displaying process 140-2 maintains a list of every node (i.e., the first object 135, the second object 145, etc.) visited during the traversal of the directed cyclic graph 175-1. The logic displaying process 140-2 traverses the directed cyclic graph 175-1, breadth first, and identifies the second video clip (i.e., a second object 145) linked to the first video clip (i.e., the first object 135), at the first section on the display list 170 of the second video clip (i.e., a second object 145), as the first node on the directed cyclic graph 175-1, and correlates the first node to the second video clip (i.e., a second object 145).

In step 221, the logic displaying process 140-2 identifies the first node as a subsequence occurrence of the second object 145. In an example configuration, the second video clip (i.e., a second object 155) has a display list 170, identifying various sections (i.e., a first section on the display list 170, a second section on the display list 170, etc) of the second video clip (i.e., a second object 145). The DVD authoring project 180 can create a relationship 120 between the first video clip (i.e., a first object 135) and the second video clip (i.e., the second object 145), with second video clip (i.e., a second object 145) starting at the first section on the display list 170. The logic displaying process 140-2 traverses the directed cyclic graph 175-1, and maintains a list of every node (i.e., the first object 135, the second object 145, etc.) visited during the traversal of the directed cyclic graph 175-1. The logic displaying process 140-2 traverses the directed cyclic graph 175-1, breadth first, and identifies the second video clip (i.e., a second object 145) linked to the first video clip (i.e., the first object 135), at the first section on the display list 170 of the second video clip (i.e., a second object 145), as the first node on the directed cyclic graph 175-1. The logic displaying process 140-2 determines that this first node exists on the list of every node visited during the traversal of the directed cyclic graph 175-1, correlates the first node to the second video clip (i.e., a second object 145). The logic displaying process 140-2 then identifies the second video clip (i.e., a second object 145) linked to the first video clip (i.e., the first object 135), at the first section on the display list 170 of the second video clip (i.e., a second object 145), as a subsequent occurrence of the second video clip (i.e., the second object 145).

Figure 8:
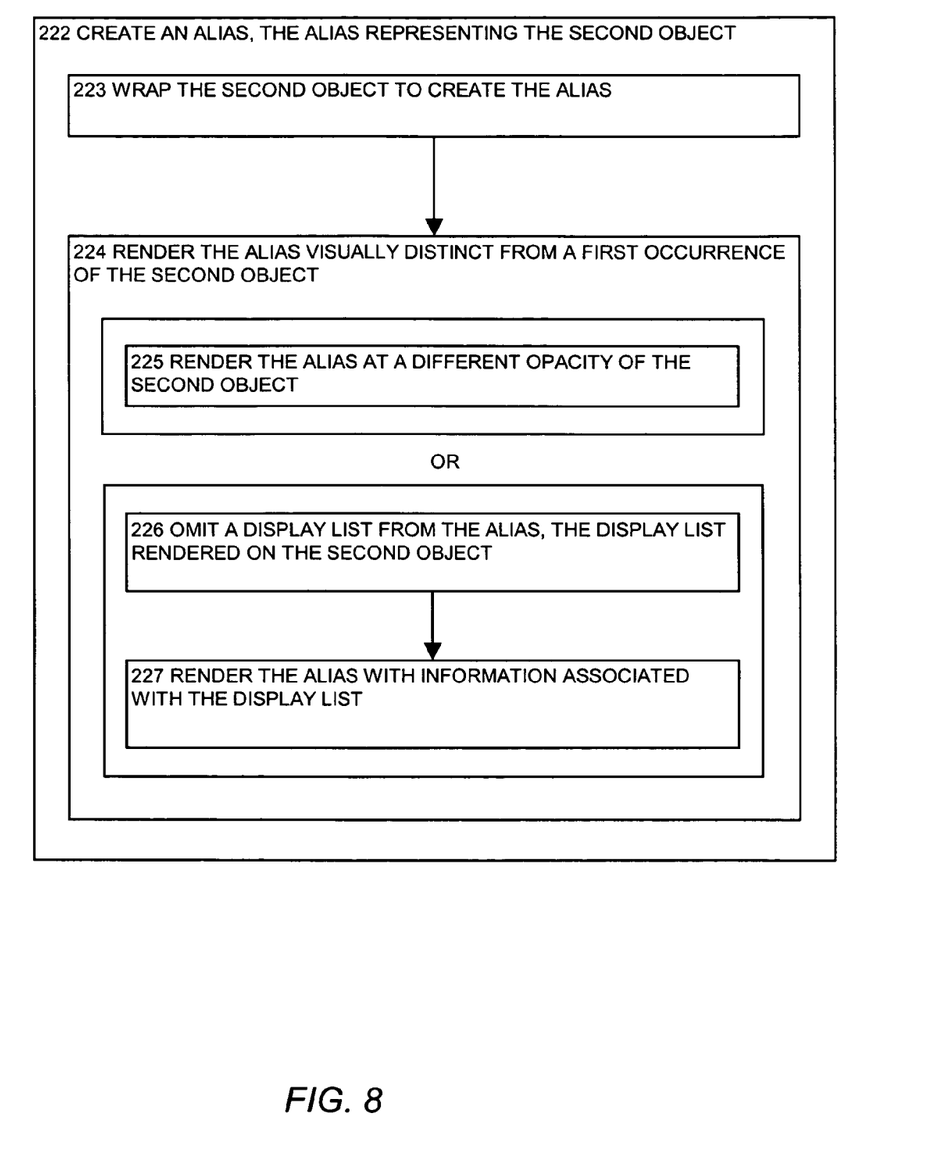
FIG. 8 illustrates a flowchart of a procedure performed by the system of FIG. 1 when the logic displaying process creates an alias, the alias representing the second object, according to one embodiment disclosed herein.

FIG. 8 is an embodiment of the steps performed by the logic displaying process 140-2 when it creates an alias 125-1, and renders the alias 125-1 visually distinct from a first occurrence of the second object 145.

In step 222, the logic displaying process 140-2 creates an alias 125-1, the alias 125-1 representing the second object 145. In an example embodiment, a DVD authoring project 180 displays the contents of the DVD as a cyclical graph containing, for example, a first video clip (i.e., a first object 135) linked to a second video clip (i.e., a second object 145). The logic displaying process 140-2 traverses the directed cyclic graph 175-1, and discovers a relationship 120 between, for example, the first video clip (i.e., a first object 135), and the second video clip (i.e., a second object 145). The logic displaying process 140-2 creates an alias 125-1 that represents the second video clip (i.e., a second object 145).

In step 223, the logic displaying process 140-2 wraps the second object 145 to create the alias 125-1. In an example embodiment, a DVD authoring project 180 displays the contents of the DVD as a cyclical graph containing, for example, a first video clip (i.e., a first object 135) linked to a second video clip (i.e., a second object 145). The logic displaying process 140-2 traverses the directed cyclic graph 175-1, and discovers a relationship 120 between, for example, the first video clip (i.e., a first object 135), and the second video clip (i.e., a second object 145). The logic displaying process 140-2 identifies this instance of the second video clip (i.e., a second object 145) as a subsequent occurrence of the second video clip (i.e., a second object 145), and wraps second video clip (i.e., a second object 145) to create the alias 125-1. In an example embodiment, the logic displaying process 140-2 wraps the wraps second video clip (i.e., a second object 145) with a software header and footer to create the alias 125-1. In step 224, the logic displaying process 140-2 renders the alias 125-1 visually distinct from a first occurrence of the second object 145. In an example embodiment, a DVD authoring project 180 displays the contents of the DVD as a cyclical graph containing, for example, a first video clip (i.e., a first object 135) linked to a second video clip (i.e., a second object 145). The logic displaying process 140-2 traverses the directed cyclic graph 175-1, and discovers a relationship 120 between, for example, the first video clip (i.e., a first object 135), and the second video clip (i.e., a second object 145). The logic displaying process 140-2 identifies this instance of the second video clip (i.e., a second object 145) as a subsequent occurrence (i.e., the logic displaying process 140-2 has already identified a first occurrence of the second video clip i.e., a second object 145) of the second video clip (i.e., a second object 145), and wraps second video clip (i.e., a second object 145) to create the alias 125-1. The alias 125-1 of the second video clip (i.e., a second object 145) is rendered within the graphical user interface 160 as visually distinct from the first occurrence of the second video clip (i.e., a second object 145).

In step 225, the logic displaying process 140-2 renders the alias 125-1 at a different opacity of the second object 145. In an example configuration, the alias 125-1 of the second video clip (i.e., a second object 145) is rendered within the graphical user interface 160 at, for example, at fifty percent opacity of the first occurrence of the second video clip (i.e., a second object 145). Thus, a user 108, such as an animation engineer, can easily identify the first occurrence of the second video clip (i.e., a second object 145) from any subsequent occurrences of the second video clip (i.e., a second object 145), rendered as aliases 125-N of the second video clip (i.e., a second object 145).

Alternatively, in step 226, the logic displaying process 140-2 omits a display list 170 from the alias 125-1, the display list 170 rendered on the second object 145. In an example configuration, a DVD authoring project 180 displays the contents of the DVD as a cyclical graph containing, for example, a first video clip (i.e., a first object 135) linked to a second video clip (i.e., a second object 145). The second video clip (i.e., a second object 145) has an associated display list 170, such as a menu. For example, the second video clip (i.e., a second object 145) has a menu (i.e., a display list 170) corresponding to chapters within that second video clip (i.e., a second object 145), such that the second video clip (i.e., a second object 145) can be started at any one of the chapters within the display list 170 associated with the second video clip (i.e., a second object 145). When the logic displaying process 140-2 renders the second video clip (i.e., a second object 145) as an alias 125-1, the logic displaying process omits the display list 170 from the alias 125-1.

In step 227, the logic displaying process 140-2 renders the alias 125-1 with information 165 associated with the display list 170. In an example configuration, a DVD authoring project 180 displays the contents of the DVD as a cyclical graph containing, for example, a first video clip (i.e., a first object 135) linked to a second video clip (i.e., a second object 145). The second video clip (i.e.; a second object 145) has an associated display list 170, such as a menu. For example, the second video clip (i.e., a second object 145) has a menu (i.e., a display list 170) corresponding to chapters within that second video clip (i.e., a second object 145), such that the second video clip (i.e., a second object 145) can be started at any one of the chapters within the display list 170 associated with the second video clip (i.e., a second object 145). When the logic displaying process 140-2 renders the second video clip (i.e., a second object 145) as an alias 125-1, the logic displaying process omits the display list 170 from the alias 125-1. However, the alias is rendered with information 165 associated with the display list 170. For example, if the alias 125-1 represents the second video clip (i.e., a second object 145) starting at, for example a second chapter associated with the display list 170 on second video clip (i.e., a second object 145), the logic displaying process 140-2 renders the alias 125-1 with information identifying that alias 125-1 as starting at the second chapter within the display list 170 associated with the second video clip (i.e., a second object 145) for which the alias 125-1 represents.

Figure 9:
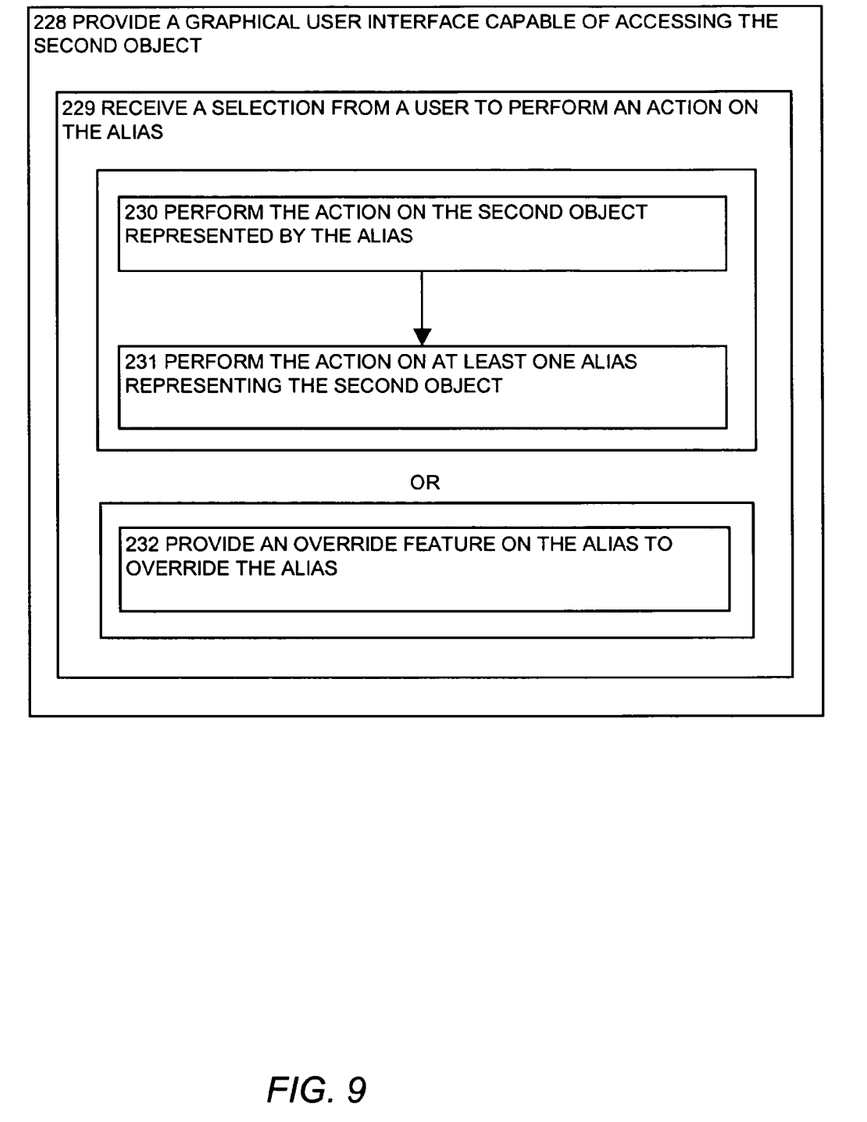
FIG. 9 illustrates a flowchart of a procedure performed by the system of FIG. 1 when the logic displaying process provides a graphical user interface capable of accessing the second object, according to one embodiment disclosed herein.

FIG. 9 is an embodiment of the steps performed by the logic displaying process 140-2 when it provides a graphical user interface 160 capable of accessing the second object 145.

In step 228, the logic displaying process 140-2 provides a graphical user interface 160 capable of accessing the second object 145. In an example configuration, a DVD authoring tool operates within a graphical user interface 160. A user 108, such as an animation engineer, arranges video clips according to a timeline, and interconnects various video clips to create the finished DVD. The DVD can have a display list 170 indicating various starting points, for example, in the case of a musical DVD, where the DVD can be started at the beginning of each song. A DVD of movie clips can have a list of menu (i.e., display list 170) items indicating, for example, the start of the movie, interviews with various actors in the movie, video clips of outtakes captured during filming of the movie, etc.

In an example embodiment, a DVD authoring project 180 displays the contents of the DVD as a cyclical graph containing, for example, a first video clip (i.e., a first object 135) linked to a second video clip (i.e., a second object 145). The logic displaying process 140-2 traverses the directed cyclic graph 175-1, discovers a relationship 120 between, for example, the first video clip (i.e., a first object 135), and the second video clip (i.e., a second object 145), and creates an alias 125-1 that represents the second video clip (i.e., a second object 145). The logic displaying process 140-2 replaces the relationship 120 with the alias 125-1 that represents the second video clip (i.e., a second object 145), and creates a reference 150 from the first video clip (i.e., a first object 135) to the alias 125-1. The animation engineer (i.e., the user 108), via the graphical user interface 160, can access the second video clip (i.e., a second object 145), or the alias 125-1 representing the second video clip (i.e., a second object 145) to modify the second video clip (i.e., a second object 145).

In step 229, the logic displaying process 140-2 receives a selection from a user 108 to perform an action on the alias 125-1. In an example configuration, a DVD authoring tool operates within a graphical user interface 160. A user 108, such as an animation engineer, arranges video clips according to a timeline, and interconnects various video clips to create the finished DVD, such as a first video clip (i.e., a first object 135), and a second video clip (i.e., a second object 145). In an example configuration, a user 108 edits the alias 125-1 that represents second video clip (i.e., a second object 145). The logic displaying process 140-2 receives the selection from the user 108 to perform an action on the alias 125-1 that represents second video clip (i.e., a second object 145).

In step 230, the logic displaying process 140-2 performs the action on the second object 145 represented by the alias 125-1. In an example configuration, a user 108 edits the alias 125-1 that represents second video clip (i.e., a second object 145). As the user 108 is editing the alias 125-1 that represents second video clip (i.e., a second object 145), the logic displaying process 140-2 is performing that same action on the second video clip (i.e., a second object 145) represented by the alias 125-1.

In step 231, the logic displaying process 140-2 performs the action on at least one alias 125-1 representing the second object 145. In an example configuration, a user 108 edits the alias 125-1 that represents second video clip (i.e., a second object 145). As the user 108 is editing the alias 125-1 that represents second video clip (i.e., a second object 145), the logic displaying process 140-2 is performing that same action on the second video clip (i.e., a second object 145) represented by the alias 125-1. In addition, the logic displaying process 140-2 is performing that same action on any other aliases 125-N that represent the second video clip (i.e., a second object 145). In other words, the logic displaying process 140-2 creates an alias 125-1 for each subsequent occurrence of the second video clip (i.e., a second object 145). If there are ten occurrences of the second video clip (i.e., a second object 145), then the logic displaying process 140-2 creates nine aliases 125-N to represent the second video clip (i.e., a second object 145). The ten occurrences of the second video clip (i.e., a second object 145) are comprised of the first occurrence of the second video clip (i.e., a second object 145) plus the nine occurrences of the second video clip (i.e., a second object 145) that the logic displaying process 140-2 creates as aliases 125-N.

In step 232, the logic displaying process 140-2 provides an override feature on the alias 125-1 to override the alias 125-1. In an example configuration, a DVD authoring tool operates within a graphical user interface 160. A user 108, such as an animation engineer, arranges video clips according to a timeline, and interconnects various video clips to create the finished DVD, such as a first video clip (i.e., a first object 135), and a second video clip (i.e., a second object 145). In an example configuration, a user 108 edits the alias 125-1 that represents second video clip (i.e., a second object 145). The alias 125-1 selected by the user 108 opens at the same point in the timeline of the second video clip (i.e., a second object 145) represented by the alias 125-1. The logic displaying process 140-2 provides an override feature on the alias 125-1 to override the alias 125-1, such that when the user 108 selects the second video clip (i.e., a second object 145) to edit the alias 125-1 that represents second video clip (i.e., a second object 145), the user 108 can open the alias 125-1 at a different point in the timeline of the second video clip (i.e., a second object 145) represented by the alias 125-1.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A computer-implemented method comprising:
identifying, via a computer system, a first object and a second object in a directed cyclic graph, wherein the directed cyclic graph comprises nodes connected to other nodes, wherein the first object and second objects are nodes on the directed cyclic graph;
converting, via the computer system, the directed cyclic graph by removing a connection between the first object and the second object, providing an alias representing an instance of the second object, and creating a reference from the first object to the alias; and
providing, via the computer system, the converted directed cyclic graph for display.

2. The method of claim 1 wherein converting the directed cyclic graph removes connections and provides aliases such that any two objects in the directed cyclic graph are connected by exactly one connection.

3. The method of claim 1 wherein converting the directed cyclic graph removes connections and provides aliases, wherein the aliases have no outgoing links.

4. The method of claim 1 wherein converting the directed cyclic graph further comprises identifying a relationship between the first object and the second object and replacing the relationship with the alias.

5. The method of claim 1 wherein providing the alias comprises wrapping the second object with a software header and footer to create the alias.

6. The method of claim 1 wherein providing the converted directed cyclic graph for display comprises providing the alias for display as visually distinct from an occurrence of the second object in the converted directed cyclic graph.

7. The method of claim 6 wherein the alias is provided for display at a different opacity than the second object.

8. The method of claim 6 wherein:
a display list is rendered on the occurrence of the second object; and
only some information from the display list is rendered on the alias.

9. The method of claim 8 wherein:
the second object is a video clip associated with a display list;
the alias represents the video clip starting from a chapter associated with the display list on the video clip; and
the alias is rendered with the only some information identifying the alias as starting from the chapter.

10. The method of claim 1 wherein providing the converted directed cyclic graph for display comprises providing a graphical user interface capable of accessing the second object.

11. The method of claim 10 wherein providing the graphical user interface comprises:
receiving a selection to perform an action on the alias;
performing the action on the second object represented by the alias; and
performing the action on at least one other alias representing the second object.

12. The method of claim 10 wherein the graphical user interface provides an override feature wherein, upon a selection of an alias for editing, portions of the second object not represented by the alias are available for editing.

13. The method of claim 1 further comprising:
identifying a starting point to begin a traversal of the directed cyclic graph by identifying a root of the directed cyclic graph; and
traversing the directed cyclic graph breadth first to identify connections to be removed in converting the directed cyclic graph by identifying subsequent occurrences of the second object.

14. The method of claim 13 wherein identifying subsequent occurrences of the second object comprises maintaining a list of every node visited during traversal of the directed cyclic graph.

15. A computerized device comprising:
a memory;
a processor;
a communications interface;
an interconnection mechanism coupling the memory, the processor and the communications interface;
wherein the memory is encoded with an application that when executed on the processor on the computerized device performs operations comprising:
identifying a first object and a second object in a directed cyclic graph, wherein the directed cyclic graph comprises nodes connected to other nodes, wherein the first object and second objects are nodes on the directed cyclic graph;
converting the directed cyclic graph by removing a connection between the first object and the second object, providing an alias representing an instance of the second object, and creating a reference from the first object to the alias; and
providing the converted directed cyclic graph for display.

16. The device of claim 15 wherein converting the directed cyclic graph removes connections and provides aliases such that any two objects in the directed cyclic graph are connected by exactly one connection.

17. The device of claim 15 wherein converting the directed cyclic graph removes connections and provides aliases, wherein the aliases have no outgoing links.

18. The device of claim 15 wherein providing the converted directed cyclic graph for display comprises providing a graphical user interface capable of accessing the second object, wherein providing the graphical user interface comprises:
receiving a selection to perform an action on the alias;
performing the action on the second object represented by the alias; and
performing the action on at least one other alias representing the second object.

19. A non-transitory computer readable medium encoded with computer programming logic that when executed on a process in a computerized device produces a logic displaying process that provides a logical display, the medium comprising:
program code for identifying a first object and a second object in a directed cyclic graph, wherein the directed cyclic graph comprises nodes connected to other nodes, wherein the first object and second objects are nodes on the directed cyclic graph;

program code for converting the directed cyclic graph by removing a connection between the first object and the second object, providing an alias representing an instance of the second object, and creating a reference from the first object to the alias; and program code for providing the converted directed cyclic graph for display.

\* \* \* \* \*